United States Patent
Bloomfield et al.

[11] 3,718,096
[45] Feb. 27, 1973

[54] VORTEX THRUSTER FOR FLUID PROPELLED OBJECTS

[75] Inventors: Roger D. Bloomfield, Minneapolis; Gary J. Wirth, St. Paul, both of Minn.

[73] Assignee: Uniflo Systems Company, South Edina, Minn.

[22] Filed: Nov. 17, 1970

[21] Appl. No.: 90,257

[52] U.S. Cl.................104/155, 104/23 FS, 415/53 T
[51] Int. Cl. .............................................B61b 13/12
[58] Field of Search ..........104/23 FS, 132, 154, 155; 415/53 T, 56

[56] References Cited

UNITED STATES PATENTS

| | | | |
|---|---|---|---|
| 2,869,479 | 1/1959 | Hutchinson | 104/23 FS |
| 768,210 | 8/1904 | Wolke | 415/56 |
| 443,772 | 12/1890 | Parke | 104/134 |
| 3,013,505 | 12/1961 | Burke | 104/23 FS |
| 3,547,042 | 12/1970 | O'Connor | 104/155 |
| 2,496,496 | 2/1950 | Roth | 415/53 T |
| 769,425 | 9/1904 | Zahikjanz | 415/56 |

*Primary Examiner*—James B. Marbert
*Assistant Examiner*—D. W. Keen
*Attorney*—Dugger, Peterson, Johnson & Westman

[57] ABSTRACT

A thruster for fluid propelled objects such as levitated vehicles, or rotating machinery to increase the efficiency of relative thrust between the relatively moving parts. The primary device is a vehicle levitated through valves acting from a duct below the track. The vortex type thruster is designed to utilize substantially all of the energy stored in the fluid which is supplied under pressure through the thruster. The thruster is made in two sections, one forming a section of the stationary member, and a complementary section mounted on the moving member.

10 Claims, 5 Drawing Figures

PATENTED FEB 27 1973

INVENTORS
ROGER D. BLOOMFIELD
GARY J. WIRTH
BY
Dugger, Peterson, Johnson & Westman
ATTORNEYS

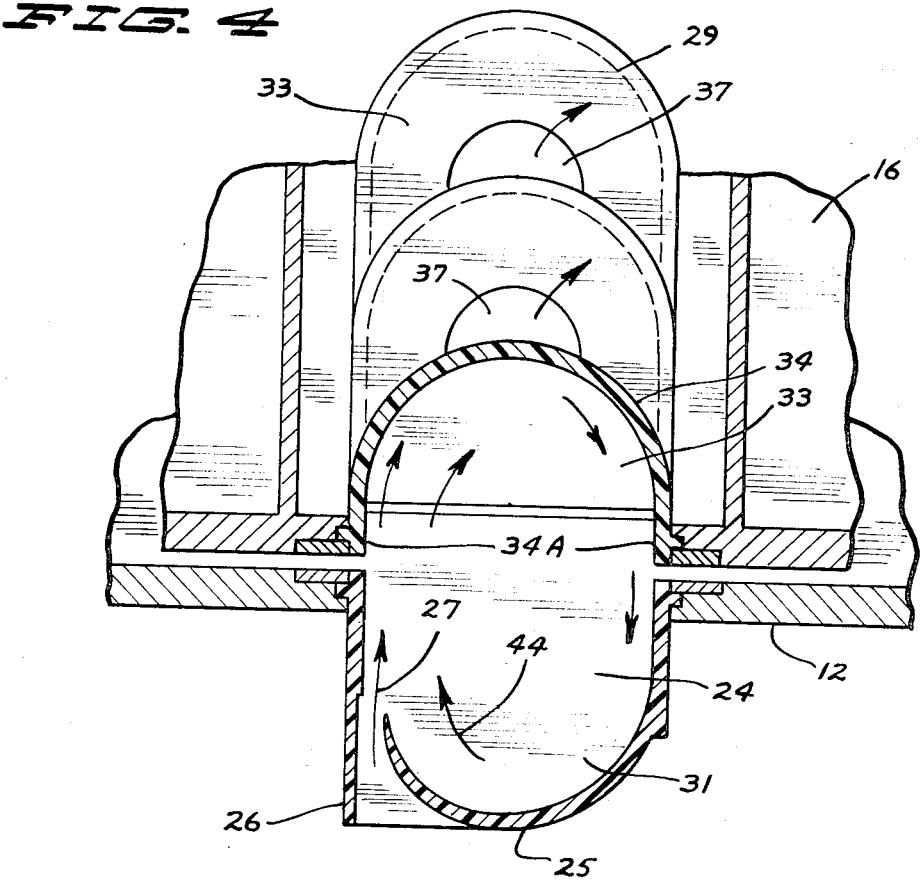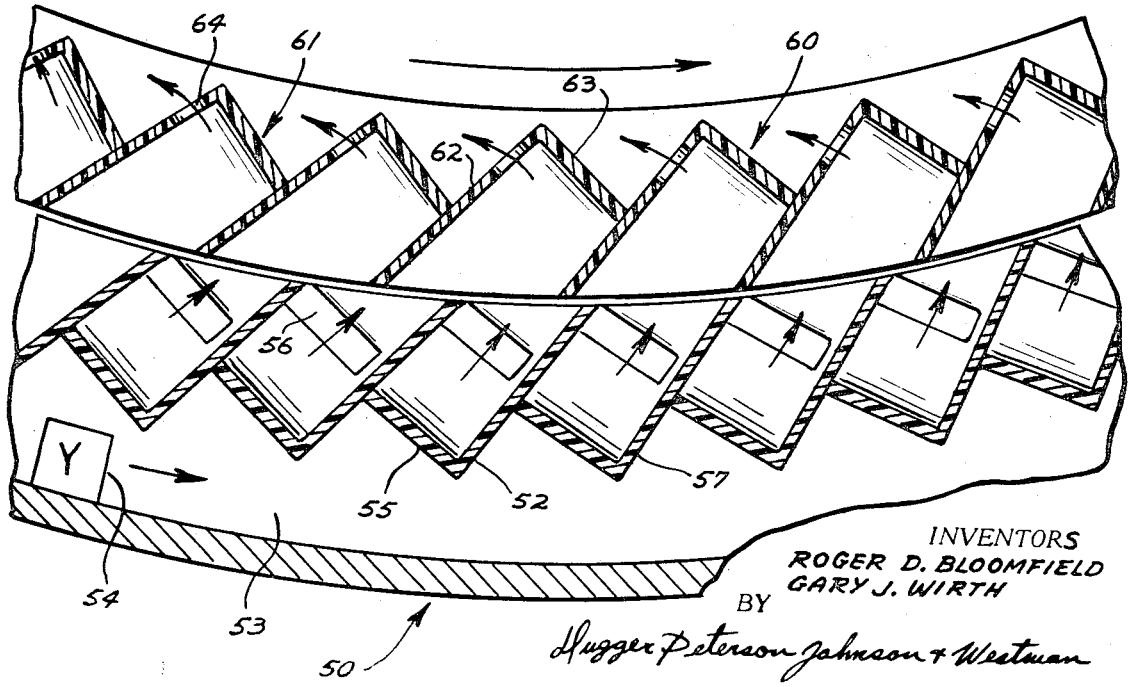

VORTEX THRUSTER FOR FLUID PROPELLED OBJECTS

BACKGROUND OF THE INVENTION

1. Field of the Invention

The present invention has relation to thrust producers for use with fluid propelled devices to produce maximum thrust from the fluid used.

2. Prior Art

The production of thrust or force from air or other fluid is usually somewhat inefficient, particularly when operating with levitated vehicles. In order to make the unit operate efficiently various devices have been advanced including baffling under the vehicles, and directional nozzles ejecting air toward the vehicle.

Reentry thrust multipliers for fluid propulsion are shown in the United States patent to Goddard, U.S. Pat. No. 2,511,979. Tubes which merely redirect fluid once are shown there, and maximum utilization of the fluid energy is not achieved.

U.S. Pat. Nos. 969,772 and 465,151 also show turbine bucket type thrusters for propulsion of vehicles.

SUMMARY OF THE INVENTION

The present invention relates to means for producing a thrust on one object in relation to another using fluid under pressure. As shown, one form of the invention forms a thruster for use with levitated vehicles operating along a guideway or track. The thruster as shown comprises two sections. A nozzle section in the stationary member is located with respect to the moving member so that it will substantially mate with a bucket section in the moving member. The air or fluid is introduced through a nozzle in the stationary section and then the air goes to buckets in the moving section which return air to buckets in the deck to produce thrust. A fluid vortex develops and the fluid continues to move helically between the stationary section and moving section of the thruster as they move relative to each other. The buckets in one section include an exhaust port or opening for fluid which has spent its energy, and these exhaust ports are located so that the high velocity air does not escape through the exhaust ports, but only after the air has slowed down is it exhausted from the system. The fluid follows a helical path transferring several times between the vehicle and guideway buckets thus increasing efficiency substantially. The unit is easy to make, and simple to install. High efficiency is produced and losses are minimized.

BRIEF DESCRIPTION OF THE DRAWINGS

FIG. 4 is a fragmentary sectional view taken as on line 4—4 in FIG. 2; and

FIG. 5 is a fragmentary section of the thruster as it would be located in rotating machinery.

Figure 1:
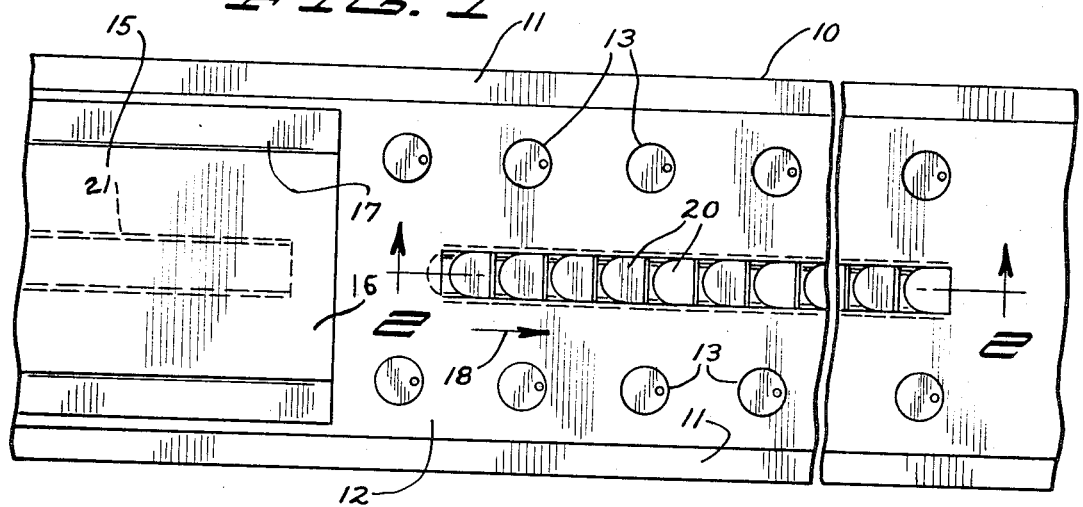
FIG. 1 is a fragmentary top plan view of a levitated vehicle and vehicle guideway having a thruster section made according to the present invention installed thereon.

In the device of FIG. 1, there is shown a levitated vehicle track or guideway 10 having side walls 11, 11, and a deck or floor 12. Suitable valve means 13 are provided through the deck 12 and lead from a fluid pressure duct 14 beneath the deck to project fluid under pressure through the valve means to levitate a vehicle 15 that is positioned between the side walls 11,11 and which moves along the guideway. The vehicle 15 is in position where it is just starting out, and acceleration means are provided.

The vehicle 15 can be of any desired form, but usually includes a bottom floor 16, suitable side walls 17, and if desired, it can have an annular flexible bag seal around the edges of the vehicle. Other edge seals may be used as well. The vehicle platform 16 clears the top of the deck 12 of the guideway and the vehicle 15 is moved along in a normal direction as indicated by the arrow 18.

The acceleration means provided herewith comprise a turbine bucket type thruster, having two sections. There is a first deck section illustrated generally at 20 and a second vehicle section illustrated generally at 21.

Each of the thruster sections is made up of a plurality of bucket members positioned together. For example, each of the bucket members 22 of the deck section 20 is mounted within a housing 23, and each bucket includes an inclined wall 24 extending in a plane approximately 45° to the direction of travel of the vehicle. The buckets each have a bottom wall 25 which is part cylindrical in shape, and the wall 24 of the next adjacent bucket closes one side of each bucket to form a chamber. The deck bucket chambers are open at the top and the lower portions thereof have a straight side wall section 26 along one side thereof that is spaced from the part cylindrical wall 25 to form a fluid inlet nozzle 27. The nozzle 27 opens from the chamber 30 formed in the housing 23 and into the interior cavity 31 formed in the bucket sections in the deck.

Figure 2:
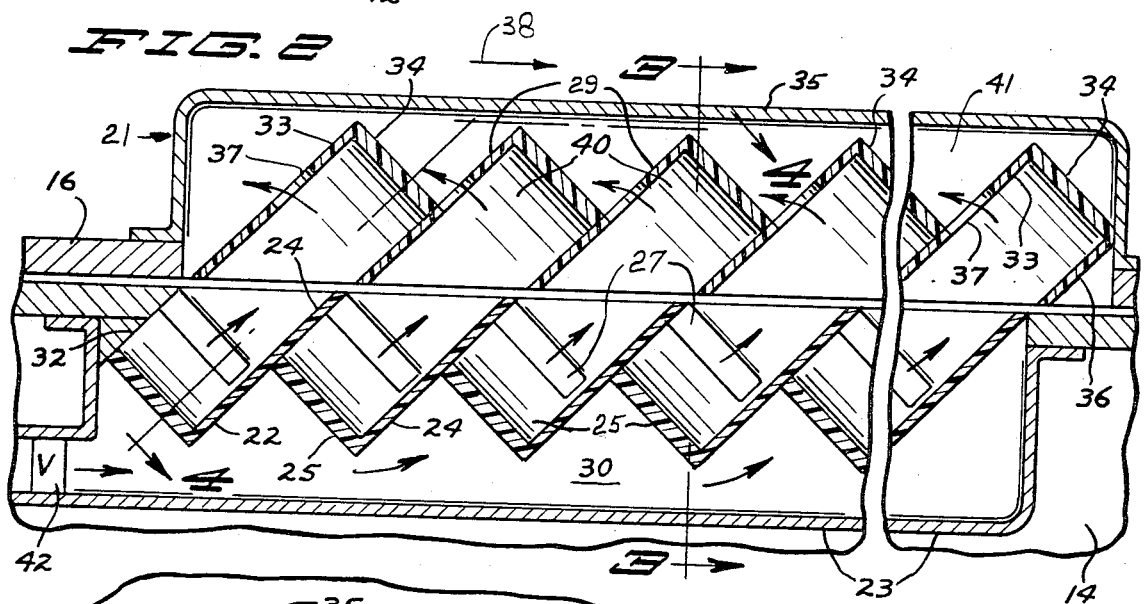
FIG. 2 is a sectional view taken as on line 2—2 in FIG. 1, with the levitated vehicle in place exactly aligning with the section of the thruster in the guideway.

The end one of the thruster buckets 22 adjacent the left hand side of FIG. 2 has a wall 32 closing off the interior chamber 31 of the end bucket.

Fluid under pressure is supplied to the chamber 30 through a valve shown schematically at 42 which can be controlled in any desired manner by manual or automatic controls.

Figure 3:
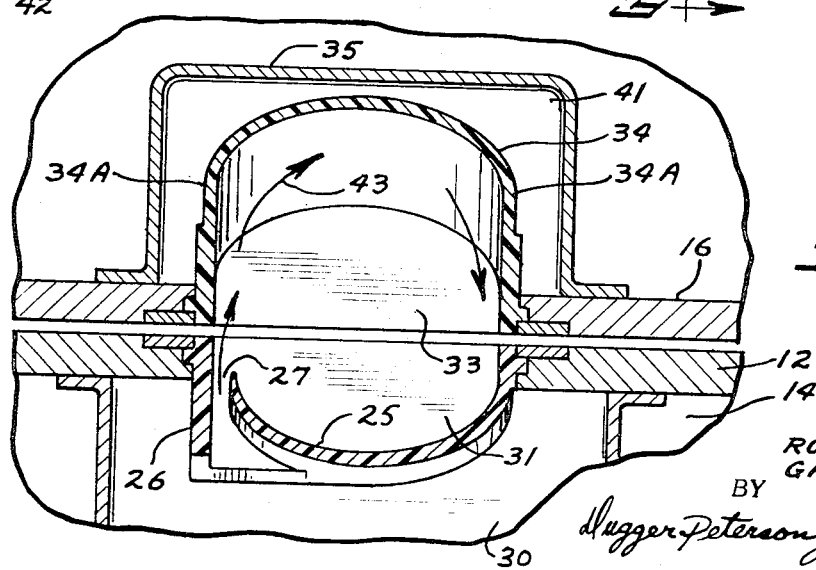
FIG. 3 is a sectional view taken as on line 3—3 in FIG. 2.

In the vehicle thruster section 21 there are buckets 29 that are held together. These buckets 29 are formed with planar walls 33 that are aligned at an angle at approximately 45° to the direction of travel of the vehicle, and part cylindrical reaction walls 34 at the top portions thereof, as perhaps best seen in FIGS. 3 and 4. The walls 34 join straight sections 34A extending down to the terminal plane along the bottom of the vehicle. The buckets 29 are enclosed within a housing 35 that is attached to the floor 16 of the vehicle 15. The walls 33 actually form the rear walls of the vehicle buckets, and when the buckets are in assembly as shown in FIG. 2, the wall 34 of each of the buckets rests against the wall 33 of the next adjacent bucket in forwardly direction, which is indicated by the arrow 38. The forward end bucket 29 of the vehicle section has a closing wall 36. The buckets 29 in the vehicle are open at the bottom, and thus communicate with the open tops of the buckets 22 in the deck or floor thruster section when they are aligned.

Each of the walls 34 is provided with a centrally located exhaust opening 37. The opening 37 in each of the walls 33 is positioned so that it will discharge out of the chambers 40 formed by each of the buckets 29. The openings 37 are above the walls 34 and open into a chamber 41 formed by the housing 35. The housing 35 also has openings for discharging the chamber 41 to atmosphere, and these are not shown, but could be any desired type of discharge openings.

Acceleration and thrust is effected by introducing fluid or air under pressure through a valve 42 into the chamber 30. This air under pressure then enters through the nozzle 27 into the buckets 22 in the track section, and this air is blasted out in a layer or sheet of air that goes out the open top of each deck bucket and enters an overlying vehicle bucket 29, along the side wall 34A. This air then flows along as indicated by the arrow 43 in a circular path around the curved wall 34 back down into an aligning bucket 22 in the deck section, thereby producing thrust. The curved wall 25 of the deck section then directs this layer of air around the curved wall 25 as shown by the arrows 44 in FIG. 4, back up into the center portions of the chambers 40 in the vehicle buckets. The air continues to move around and goes back to the deck, again producing thrust on the vehicle. The vehicle is moving forwardly and when the air reaches the center portions of the bucket 29 it will exhaust out through the openings 37 in the vehicle buckets. The air actually forms laminations of flow, and the fluid or air velocity of course is the greatest along the outer periphery that has the greatest distance of travel, and the inner layers of the vortex are at a lower velocity. As the velocity head of the fluid drops, its energy stored also drops and then the slow stagnant air is discharged out through the discharge openings 37 after maximum energy utilization. The forward thrust is derived by reaction of the air on the vehicle buckets. The air generally follows a helical path, and as it slows down it spirals in towards the center where it exhausts out through the exhaust port. The air returned from the vehicle to the deck buckets acts with different deck buckets each time it is cycled because the vehicle move relative to the deck. No thrust will result, of course, when the vehicle speed equals the horizontal component of the fluid velocity.

Although perfect alignment of the buckets is shown in FIG. 2, when the vehicle moves the bucket walls become offset. The air spirals in toward the center of the buckets, and this means that any losses from the gap between the upper and lower thruster section and between the vehicle and deck is minimized since only the outer edge of the vortex of fluid formed is near the gap. Shear forces which show up as a loss in many turbine type thrusters help keep the air moving in this device. The nozzle 27 ejects a layer of high velocity air that is spiraled around the walls of the buckets in the vehicle and deck. The nozzle and buckets form a vortex, acting between the buckets to give a high efficiency in utilization of energy in the air, thus giving higher acceleration for power input in a levitated vehicle.

The levitated vehicle and tracks, as well as the operations of the valves, can be the same as that described in the copending application of Roger D. Bloomfield, Ser. No. 37,691, filed May 15, 1970, and known to these applicants.

The thruster of the present invention can also be utilized in a rotating machine. The construction of the buckets in both the stationary and movable thruster sections are exactly the same. The rotating section is the same construction as the thruster section on the vehicle, and the stationary section is the same construction as that in the track of the previous form of the invention. Referring specifically to FIG. 5, the rotating unit utilizes a stationary section 50 which is an outer annular shell of circular cross section, and this unit 50 has an outer wall 51, and a plurality of buckets 52 mounted around the periphery thereof to form a plenum chamber 53 into which air can be admitted through a valve 54. This would be then like the plenum chamber underneath the vehicle track. The buckets 52, as shown, are arranged like the buckets 22 in FIG. 2, except that they are wrapped annularly around the center of rotation. The buckets 52 have curved end walls 55, inlets 56 corresponding to the inlets 27, and walls 57 corresponding to the walls 24. Air or fluid under pressure then enters from the plenum chamber 53 and is directed inwardly toward the interior of the curved member 50. A rotor shown generally at 60 is rotatably mounted on suitable bearings and with suitable supports, which are not shown, but can be of any desired construction such as a turbine and has a series of buckets 61 which correspond to the reaction buckets 29 in the vehicle, as shown in FIG. 2. These buckets 61 have inclined walls 62, end walls 63, and the end walls 63 are curved transversely just as the walls 34. Thus, when fluid under pressure enters from the openings 56 it would be directed toward the rotating buckets 61, against the walls 63, and the fluid circulates back to the buckets 52, then back to the bucket 61 and is discharged out through openings 64 in the buckets 61 after it has circulated in a vortex between the buckets to produce thrust. The openings 64 open into atmosphere to permit the air to be easily discharged. The rotor 60 then is accelerated or thrusted with the improved efficiency described in connection with a straight line moving vehicle and stationary member. The increase in thrust improves efficiency of operation.

Thus the device of the invention has applications for both linearly movable structures and rotationally movable structures.

The buckets constructed according to the present invention could be arranged all the way around the periphery of the rotating sections, or they could be in separated segments spaced around the periphery of the rotating members to aid in thrust in certain positions of the rotor with respect to the stator.

Of course, the inner annular member could be made the stator, and the outer peripheral member 50 could be rotating if desired.

Another feature is the possibility of combining the use of the present thruster for high starting forces or torque and using other conventional bucket thrusters for high speed operation.

What is claimed is:

1. A thrust producing unit for utilization of fluid pressure in propelling levitated vehicles comprising first and second members between which relative movement takes place along a plane, first means defining a plurality of buckets in a first of said members open in direction toward a second of said members, second means defining complementary buckets in a second of said members open in direction toward said first member, fluid inlet means defined in a first bucket on a first of said members adjacent one side thereof to move fluid toward a bucket on the second of said members, said buckets being shaped to direct fluid into a return path, whereby fluid from the bucket of said second member is directed back toward said first bucket of said first member, and said first bucket in said first member further including wall means to direct said fluid returned from the second member back toward said second member.

2. The combination as specified in claim 1 wherein said buckets include wall means inclined at an oblique angle with respect to the plane of movement of said members and the wall means intersecting the plane of movement along a line which is substantially perpendicular to the direction of movement between the members.

3. The combination as specified in claim 1 wherein each of said buckets in said second member include exhaust opening means from the central portions thereof to atmosphere.

4. The combination as specified in claim 1 wherein said members comprise a track and a levitated vehicle above said track, said exhaust means being defined in the buckets in said levitated vehicle.

5. A fluid thrust reaction device to provide thrust from fluid under pressure, comprising first and second members between which relative thrust is exerted, first means defining a plurality of adjacent first buckets in a first of said members, second means defining complementary adjacent second buckets in a second of said members, fluid inlet means in said first means adjacent a side of each of said first buckets and directed toward an aligning second bucket on the second of said members adjacent one side thereof, said second buckets in said second member including wall means shaped to direct fluid into a return path and discharge fluid from said second member back toward a bucket in said first member from which fluid was received, said buckets including wall means positioned to give a thrust output in direction parallel to fluid motion between the sections.

6. The combination as specified in claim 5 wherein each of said second buckets in said second member include exhaust opening means in the central portions thereof.

7. The combination as specified in claim 5 wherein each of the first and second buckets have lateral side walls forming chambers with unobstructed openings between said side walls.

8. The device of Claim 5 wherein said first member is a rotating member moving relative to said second member.

9. A thrust producing unit for producing thrust from fluid under pressure to move a second member relative to a first member in a direction of travel comprising a first thruster section mounted in said first member, said first thruster section including a plurality of first buckets, each of said first buckets being defined by a first main wall terminating along a line substantially normal to the direction of movement of the second member and oblique to the plane of movement of the second member, said main walls being spaced in direction of movement, separate wall means joined to each of said main walls to form separate first chambers between adjacent main walls and having openings open toward the second member, each of said separate wall means having spaced side wall portions, which are substantially aligned in direction perpendicular to the direction of travel of the second member, and a curved end wall joining said side wall portions to cause fluid flow toward the curved end wall portion along a first side wall portion to change direction to flow toward the second member adjacent a second side wall portion, second bucket means on said second member, each comprising a second main wall aligning with the direction of extension of the first main walls of said first buckets, said second bucket means on said second member including second separate wall means positioned between adjacent second main walls to form separate second chambers open in direction toward said first member, said second separate wall means each including spaced second side wall portions and a second curved wall portion joining said spaced second side wall portions to cause fluid flow entering the second chambers along one side wall portion of the second separate wall means to flow around the corresponding curved wall portion and along the other side wall portion toward the first member, nozzle means opening into each of the first buckets adjacent one side thereof and being positioned to direct fluid flow therethrough along the side wall portions of aligning second buckets toward said first buckets, means defining a plenum chamber open to each of said nozzle means to supply fluid under pressure to said nozzle means, said curved wall portions of said first and second buckets causing fluid flowing from said nozzle to move in a recirculating path toward the aligning portions of buckets on the two members, and fluid exhaust opening means in the central portions of each of the second buckets.

10. The thrust producing device of claim 9 wherein said second member is a rotating member moving relative to said first member.

* * * * *